(12) United States Patent
Capron et al.

(10) Patent No.: US 7,615,600 B2
(45) Date of Patent: Nov. 10, 2009

(54) FLUOROPOLYMERS AND MEMBRANES PREPARED FROM SUCH POLYMERS, IN PARTICULAR FOR FUEL CELLS AND METHOD FOR SYNTHESIZING SUCH POLYMERS

(75) Inventors: Philippe Capron, Luzinay (FR); Bruno Ameduri, Montpellier (FR); Bernard Boutevin, Montpellier (FR); Renaud Souzy, Le Bissardon (FR)

(73) Assignee: Commissariat a l'Energie Atomique, Paris (FR)

( * ) Notice: Subject to any disclaimer, the term of this patent is extended or adjusted under 35 U.S.C. 154(b) by 88 days.

(21) Appl. No.: 11/577,011

(22) PCT Filed: Oct. 14, 2005

(86) PCT No.: PCT/FR2005/050857

§ 371 (c)(1),
(2), (4) Date: May 21, 2007

(87) PCT Pub. No.: WO2006/042994

PCT Pub. Date: Apr. 27, 2006

(65) Prior Publication Data

US 2008/0051479 A1    Feb. 28, 2008

(30) Foreign Application Priority Data

Oct. 19, 2004   (FR)   ................... 04 11081

(51) Int. Cl.
*C08F 18/20*   (2006.01)
(52) U.S. Cl. .................. 526/245; 526/75; 526/247; 526/249; 526/317.1
(58) Field of Classification Search ................ 526/242, 526/245
See application file for complete search history.

(56) References Cited

U.S. PATENT DOCUMENTS 4,778,629 A * 10/1988 Grabley et al. ............... 554/92
2002/0146639 A1 * 10/2002 Brock et al. ............ 430/270.1

FOREIGN PATENT DOCUMENTS

FR    2 843 398    2/2004

WO    WO96/40798    12/1996

OTHER PUBLICATIONS

Mislavsky, "Fluorinated Polymers with Functional Groups: Synthesis and Applications, Langmuir-Blodgett Films from Functional Fluoropolymers", Fluoropolymers 1: Synthesis, 1999, Kluwer Academic/Plenum Publishers, p. 100-101.*
translation of FR2843398, Didier et al., Sept. 2008.*

* cited by examiner

*Primary Examiner*—Marc S Zimmer
*Assistant Examiner*—Nicole M Buie
(74) *Attorney, Agent, or Firm*—Heslin Rothenberg Farley & Mesiti P.C.; Lee J. Fleckenstein

(57) ABSTRACT

Fluoropolymers comprising at least one repeat unit of formula (I):

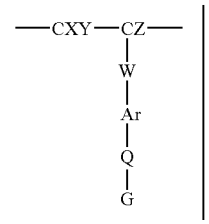

wherein:
groups X and Y, identical or different, represent H or F;
group Z represents F or a perfluorinated alkyl group;
group W represents $CH_2O$ or $CF_2O$ or $CO_2$;
group Ar represents a divalent group including at least one optionally substituted carbon-containing aromatic cycle;
group Q represents a single bond, $(CF_2)_n$ with $1 \leq n \leq 10$, or $C_2F_4OC_2F_4$;
group G represents a cation exchanging group, preferably selected among:
$SO_2R_1$, with $R_1$ representing OH, F or Cl; or
$P(=O)(OR_2)_2$ with $R_2$ representing H or an optionally substituted alkyl group; or
$CO_2H$
and having ion exchange capacity not less than 0.5 meq/g polymer are provided. Methods of synthesis, membranes obtained using these polymers and fuel cell systems containing such membranes are also provided.

20 Claims, No Drawings

FLUOROPOLYMERS AND MEMBRANES PREPARED FROM SUCH POLYMERS, IN PARTICULAR FOR FUEL CELLS AND METHOD FOR SYNTHESIZING SUCH POLYMERS

TECHNICAL FIELD

This invention concerns new fluoropolymers and the method for preparing them.

These polymers, which have excellent physicochemical properties, such as protonic conductivity and chemical stability, especially have applications in the development of ion-exchanging membranes, notably for fuel cells.

Such a membrane constitutes the core of a fuel cell. It should be briefly pointed out that such fuel cells comprise two electrodes, an anode and a cathode, which are constantly supplied with the comburent and the fuel, and which are separated by an electrolyte. The membrane ensures the passage of protons from the anode to the cathode. It is impermeable to hydrogen, methane and air combustibles. Its thickness is between 10 and 200 µm.

PREVIOUS STATE OF THE ART

Various families of protonic conductor polymers exist today which can be used in the context of fuel cell membranes.

Sulphonated polymers with a thermostable backbone base, such as sulphonated polysulphones, sulphonated polyether ether ketones, sulphonated polystyrenes and sulphonated polybenzimidazols, have weak chemical and thermal stability. Thus, the fuel cells constituted of membranes obtained from such polymers have limited durability and temperature of use.

To date, the best performances have been obtained with perfluorinated polymers containing a fluorinated side chain with a sulphonated group, for example Nafion (Dupont de Nemours, registered trademark) with the following formula:

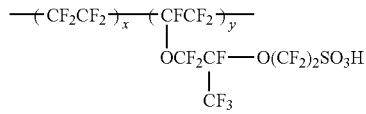

The products Flemion (Asahi Casei), Hyflon (Solvay) and Dow (Dow Chemical) (registered trademarks) are similar fluoropolymers which are distinguished by the length of the fluorinated chain. These polymers have excellent properties in terms of chemical and electrochemical stability. Moreover, they have very good protonic conductivity and currently constitute the reference materials for fuel cells.

The membranes obtained using these polymers, however, have weak thermomechanical and hydrothermal stability, which forbids the operation of the derived fuel cells at temperatures above 80° C. Furthermore, the cost of these membranes is particularly high, due to the expensiveness of fluorine chemistry and the explosive nature of one of the precursors, VF2.

Document FR-A-2 843 398 describes a new polymer structure containing both fluorinated aliphatic units and fluorinated aromatic units with an ionic function, notably sulphonic or phosphonic. The membranes obtained from these polymers have none of the aforementioned disadvantages.

In this document, the polymers are obtained by conventional polymerisation between the two families of monomers (aliphatic and aromatic), or by grafting aromatic units onto the aliphatic units after ozone attack.

The Applicant has observed that, by applying the disclosures in this document, he obtained polymers with a low rate of incorporation of sulphonic or phosphonic functions (approximately 15% mole fraction) and also with a low molar mass giving poor mechanical characteristics. These results may be explained by the limited reactivity of the ionic aromatic monomer compared with aliphatic monomers constituting the polymer in question. Consequently, the membranes elaborated from such polymers have weak mechanical properties and protonic conductivity of approximately $10^{-4}$ S/cm, insufficient for the required specifications (approximately $10^{-2}$ S/cm).

SUMMARY OF THE INVENTION

This invention proposes chemical polymer structures similar to those described in document FR-A-2 843 398, but whose method of synthesis provides high levels of integration of the aromatic monomer with the ionic function. The membranes elaborated with such polymers have qualities, notably in terms of mechanical and heat stability properties, that are highly superior to those described in the previous state of the art, notably in the aforementioned document.

Thus, the invention concerns fluoropolymers comprising at least one repeat unit of formula (I):

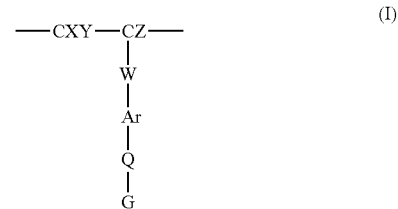

wherein:
  groups X and Y, identical or different, represent H or F;
  group Z represents F or a perfluorinated alkyl group;
  group W represents $CH_2O$ or $CF_2O$ or $CO_2$;
  group Ar represents a divalent group including at least one optionally substituted carbon-containing aromatic cycle;
  group Q represents a single bond, $(CF_2)_n$ with $1 \leq n \leq 10$, or $C_2F_4OC_2F_4$;
  group G represents a cation exchanging group, preferably selected among:
    $SO_2R_1$, with $R_1$ representing OH, F or Cl; or
    $P(\!=\!O)(OR_2)_2$ with $R_2$ representing H or an optionally substituted alkyl group; or
    $CO_2H$.

By the term "repeat", we mean that this unit is repeated n times in the polymer chain, with n advantageously being between 10 and 1,000.

According to a first embodiment, a polymer according to the invention can be of the homopolymer type.

In a second embodiment, a polymer according to the invention also contains at least one repeat unit of formula (II):

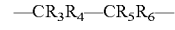

where groups $R_3$, $R_4$, $R_5$ and $R_6$, identical or different, represent H, Cl, I, an optionally substituted alkyl group, or a fluorinated group comprising one fluorine atom or an alkyl group substituted by at least one fluorine atom, with at least one of the groups $R_3$, $R_4$, $R_5$ and $R_6$ representing a fluorinated group.

The chemical formula of these polymers is differentiated from that presented in document FR-A-2 843 398 by the fact that the aromatic group (Ar) is bound to the fluorinated group (CZ) by a $CH_2O$ or $CO_2$ group, which was not foreseen in the possibilities indicated for the nature of group W in the document.

Moreover, for W=$CF_2O$, the polymer in the invention is differentiated by its ion exchange capacity that is greater than or equal to 0.5 meq/g polymer, a value which could not be obtained according to the method used in the earlier document.

The presence of the $CH_2O$ or $CO_2$ group in these polymers and the ion exchange capacity values specified for these polymers are directly linked to the new method of synthesizing these polymers, developed in compliance with the invention, in keeping with the following steps:

1/ Homopolymerisation of a Fluorinated Monomer with a Carboxylic Acid Group, such as Fluorinated Acrylic or Methacrylic Acid:

This monomer typically has formula (I'):

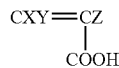

where X, Y and Z are defined as above;

or

Polymerisation of such a Monomer with at Least One Other Fluorinated Monomer.

The co-monomers are generally fluorinated aliphatic monomers of formula (II'):

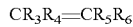

where $R_3$, $R_4$, $R_5$ and $R_6$ are defined as above.

They may be of the type selected in the group including: vinyl fluoride (VF), vinylidene fluoride (VDF), trifluoroethylene, hexafluoropropene, chlorotrifluoroethylene (CTFE), 1-hydropentafluoropropene, hexafluoroisobutylene, 3,3,3-trifluoropropene and, more generally, all fluorinated or perfluorinated vinyl compounds.

Moreover, perfluorovinyl ethers also play the role of co-monomers. Among them, we can mention perfluoroalkyl vinyl ethers (PAVE), whose alkyl group has one to three carbon atoms, for example, perfluoromethyl vinyl ether (PMVE), perfluoroethyl vinyl ether (PEVE) and perfluoropropyl vinyl ether (PPVE).

These monomers may also be perfluoroalkoxy alkyl vinyl ethers (PAAVE), such as:

perfluoro-(2-n-propoxy)-propyl-vinyl ether,
perfluoro-(2-methoxy)-propyl-vinyl ether,
perfluoro-(3-methoxy)-propyl-vinyl ether,
perfluoro-(2-methoxy)-ethyl-vinyl ether,
perfluoro-(3,6,9-trioxa-5,8-dimethyl)dodeca-1-ene,
perfluoro-(5-methyl-3,6-dioxo)-1-nonene.

Furthermore, perfluoroalkoxy alkyl vinyl ether monomers with carboxylic ends or sulphonyl fluoride ends (such as perfluoro-(4-methyl-3,6-dioxaoct-7-ene)sulphonyl fluoride) can also be used to synthesize fluorinated elastomers as described in this invention.

Mixtures of PAVE and PAAVE can also be present in the copolymers according to the invention.

Polymerisation is performed in solution, in mass, in emulsion or in microemulsion. The solvents used are of the $ClCF_2CFCl_2$, $C_6F_{14}$, n-$C_4F_{10}$, perfluoro-2-butyltetrahydrofuran (FC 75), 1,1,1,3,3-pentafluorobutane, 1,2-dichloroethane, isopropanol, tertiobutanol, acetonitrile or butyronitrile type. The preferred solvents used are 1,1,1,3,3-pentafluorbutane, acetonitrile and perfluorohexane, in quantities determined by those skilled in the art.

The polymerisation initiators used are azos (such a AIBN), dialkyl peroxydicarbonates, acetyl cyclohexane sulphonyl peroxide, aryl or alkyl peroxide, such as dibenzoyl peroxide, dicumyl peroxide, t-butyl peroxide, t-alkyl perbenzoates and t-alkyl peroxypivalates. Preference is nonetheless given to dialkyl peroxides (advantageously t-butyl peroxide), dialkyl peroxydicarbonates, such as diethyl and diisopropyl peroxydicarbonates and t-alkyl peroxypivalates such as t-butyl and t-amyl peroxypivalates and, even more particularly, t-alkyl peroxypivalates.

The polymers obtained can thus also be of the copolymer or terpolymer type.

2/ Reduction of the Carboxylic Acid Function into Alcohol Form to Allow Chemical Reaction Between the Polymer and the Aromatic Graft with the Ionic Function.

This reaction typically occurs in the presence of LiAlH4 in tetrahydrofuran at 90° C.

This reaction may be total or partial.

followed by the grafting of a cation exchange function of the sulphonic, phosphonic or carboxylic type by Mitsunobu reaction.

The source of the graft has general formula (III'):

It may, for example, be added by para phenol sulphonic acid.

Here again, the reaction may be total or partial.

This reaction generates polymers comprising repeat units of formula (I) as described above, in which group W represents $CH_2O$.

Alternatively, the second stage may consist in:

2/Esterification of the Carboxylic Acid Function Using the Alcohol Function of the Aromatic Graft with the Ionic Function.

The source of the graft is the same as that described above, with general formula (III').

After this reaction, we obtain polymers comprising repeat units of formula (I) as described above, in which group W represents $CO_2$.

possibly followed by fluorination.

Fluorination methods traditionally use compounds such as $SF_4$ or even diluted HF.

At the end of this reaction, polymers are obtained which include repeat units of formula (I) as described above, in which group W=$CO_2$ is substituted by $CF_2O$.

Thus, this invention concerns a method of synthesis making it possible to control the conduction properties of the membrane obtained using the polymers according to the invention. In the case of homopolymerisation, this control is performed on the reduction and/or grafting reactions, or esterification (step 2). In the case of polymerisation, the rate of incorporation of the acrylic monomer may also be controlled (step 1).

In the end, this new method can be used to obtain fluoropolymers with incorporation rates of at least 40 to 60% in terms of ionic-function moles/total moles. Thus, all or part of the acrylic functions can be modified to "welcome" the group with the ionic function. The IEC (Ion Exchange Capacity expressed in meq/g) of the polymer can thus be adjusted.

According to the invention, the fluoropolymers have an ion exchange capacity greater than or equal to 0.5 meq/g of polymer, preferably greater than or equal to 1 meq/g, or even 1.4 meq/g.

Thus, it was possible for the Applicant to produce membranes with the evaporation casting method, with a 0.01 S/cm protonic conductivity for a 1.4 meq/g IEC. The evaporation casting method, commonly used in this technical field, consists in solubilising the polymer in a solvent and then depositing this solution on a substrate, the thickness of the deposit being controlled with spacers. The solvent is then evaporated by heating if necessary and the membrane is removed from its substrate.

The invention thus also concerns the membranes obtained using the aforementioned polymers. Lastly, it concerns fuel cell systems integrating such membranes.

This invention will be illustrated by an example of embodiment presented below, which is in no way exclusive.

EXAMPLE OF EMBODIMENT

A—Terpolymerisation of Vinylidene Fluoride (YDF), Hexafluoropropene (HFP) and Trifluoromethyl Acrylic Acid (TFMAA)

The terpolymerisation of VDF, HFP and TFMAA is performed in a 160-ml autoclave, equipped with a pressure gauge, a rupture disc and an injection valve. The system is first drained for 20 minutes under 20 bars of nitrogen to prevent any risk of leakage or degassing.

10 g of TFMAA, 80 ml of 1,1,1,3,3-pentafluorobutane and 0.9 g of initiator (2,5-Bis(tert-butylperoxy)-2,5-diméthylhexane, tech, 90%) are then added through the injection valve in a vacuum (20 mm Hg).

17 g of HFP and 22 g of VDF are then added by double weighing.

The mixture is heated to 134° C. for 10 minutes.

After reaction, the mixture is cooled to room temperature and placed in a bath of iced water. The substance is then analysed by $^{19}$F NMR spectroscopy. The solvent is evaporated and the precipitate is solubilised in the DMF, then precipitated in cold water. This is then filtered and dried on $P_2O_5$ at room temperature in a vacuum (20 mm Hg) for 48 hours.

B—Reduction of the Carboxylic Functions of the Previously Obtained Polymer

Reduction of the carboxylic functions of the TFMAA is done with 4 nmoles of $LiAlH_4$ in a three-necked flask topped with a reflux column in a neutral atmosphere. The polymer is dissolved in anhydrous THF and added to the three-necked flask.

The mixture is then heated to a temperature of 90° C.

Reduction of the carboxylic functions is achieved after three hours of reaction. The excess of LiAlH4 is neutralised by an excess of hydrochloric acid (10% in water), thus forming a solid precipitate.

The fluoropolymer is purified by cold precipitation in pentane. This reaction provides 70% yield.

C—Grafting the Monomer with the Ionic Function by Etherification of the Previously Obtained Alcohol Functions The Mitsunobu reaction is used for etherification of the alcohol functions of the terpolymer with 4 phenol sulphonic acid [O. Mitsunobu, Synthesis, 1, 1981, 1-28].

A solution containing 12.50 g (0.048 mol) of triphenylphosphine, 10.1 g (0.058 mol) of 4-phenol sulphonic acid (previously dried on $MgSO_4$) and 60 ml of THF (60 ml) is added to a solution containing 10.1 g of diisopropylazodicarboxylate (0.051 mol) and 8.1 g of terpolymers in 100 ml of THF.

A white precipitate of triphenylphosphine oxide and diisopropyl hydrazine dicarboxylate quickly appears.

After 24 hours of stirring at room temperature, the white precipitate is eliminated by filtration. The filtrate is then evaporated and the residue is solubilised in acetonitrile. The triphenylphosphine oxide is completely eliminated by liquid/liquid extraction in hexane.

Lastly, the terpolymer is cold precipitated in pentane and dried on $P_2O_5$ in a vacuum (20 mm Hg) for 48 hours. Yield is 60%.

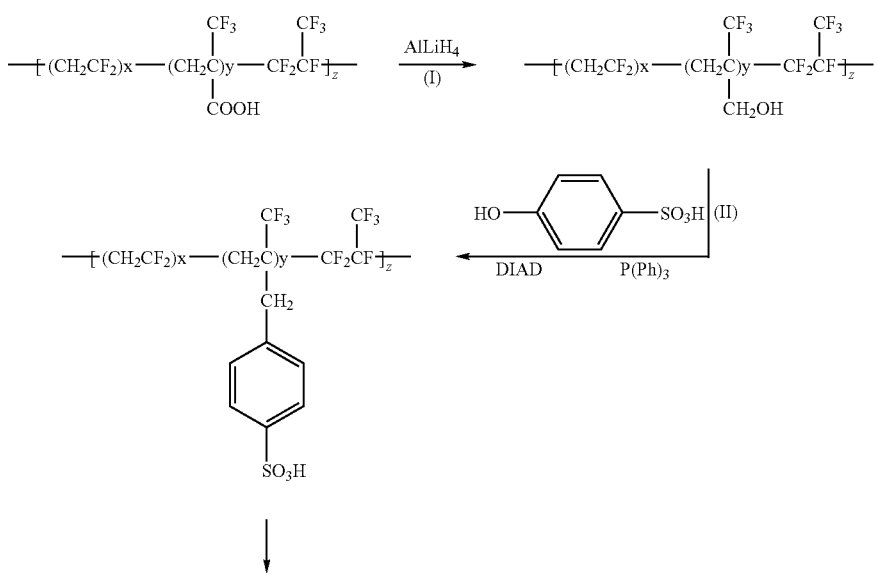

D—Preparation of Proton Exchange Membranes Using the Synthesized Polymer 10 g of terpolymer (containing 80% phenol sulphonic acid by mass) is solubilised in N-methyl pyrolidone (100 ml) at room temperature for one hour.

The membrane is then formed using the evaporation casting method.

The solvent is evaporated at 60° C. for six hours. The membrane is then acidified in a $H_2SO_4$ 1M solution for four hours, then washed in a solution of deionised water. This membrane has 0.01 S/cm conductivity for an IEC of approximately 1.3 meq/g of polymer.

The invention claimed is:

1. Fluoropolymer comprising at least one repeat unit of formula (I):

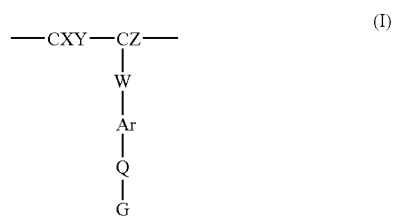

wherein:
groups X and Y, identical or different, represent H or F;
group Z represents F or a perfluorinated alkyl group;
group W represents $CH_2O$ or $CO_2$;
group Ar represents a divalent group including at least one optionally substituted carbon-containing aromatic cycle;
group Q represents a single bond, $(CF_2)_n$ with $1 \leq n \leq 10$, or $C_2F_4OC_2F_4$;
group G represents a cation exchanging group,
said fluoropolymer having ion exchange capacity not less than 0.5 meq/g polymer.

2. Fluoropolymer as claimed in claim 1, further comprising at least one repeat unit of formula (II) or perfluorovinyl ether:

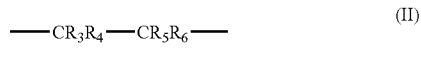

wherein groups $R_3$, $R_4$, $R_5$ and $R_6$, identical or different, represent H, Cl, I, an optionally substituted alkyl group, or a fluorinated group containing a fluorine atom or an alkyl group substituted by at least one fluorine atom, at least one of said groups $R_3$, $R_4$, $R_5$ and $R_6$ representing a fluorinated group.

3. Fluoropolymer as claimed in claim 1, wherein the fluoropolymer is a copolymer or a terpolymer.

4. Membrane containing at least one polymer as claimed in claim 1.

5. Fuel cell system containing at least one membrane as claimed in claim 4.

6. Fluoropolymer as claimed in claim 1 wherein the cation exchanging group is selected among:
$SO_2R_1$, with $R_1$ representing OH, F or Cl; or
$P(=O)(OR_2)_2$ with $R_2$ representing H or an optionally substituted alkyl group; or
$CO_2H$.

7. Fluoropolymer as claimed in claim 1, wherein the monomer of formula (II') comprises a perfluoroalkyl vinyl ether (PAVE), a periluoroalkoxyalkyl vinyl ether (PAAVE), or combinations thereof.

8. Fluoropolymer as claimed in claim 1, wherein the group Q represents $C_2F_4OC_2F_4$.

9. Method for synthesizing a fluoropolymer including the following steps:
a) homopolymerizing a monomer of formula (I'):

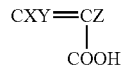

thereby forming a carboxysubstituted homopolymer; or
b) polymerizing at least one monomer of formula (I') or perfluorovinyl ether:

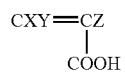

with at least one monomer of formula (II'):

thereby forming a carboxysubstituted copolymer;
wherein, in formulas (I') and (II'):
groups X and Y, identical or different, represent H or F;
group Z represents F or a perfluorinated alkyl group;
groups $R_3$, $R_4$, $R_5$ and $R_6$, identical or different, represent H, Cl, I, an optionally substituted alkyl group, or a fluorinated group containing a fluorine atom or an alkyl group substituted by at least one fluorine atom, at least one of said groups $R_3$, $R_4$, $R_5$ and $R_6$ representing a fluorinated group;
c) reducing the carboxylic acid function in said homopolymer or said copolymer into an alcohol function;
d) grafting, using the Mitsunobu reaction, onto said alcohol function obtained in step c), of an aromatic monomer with an ionic function, of formula (III'):

wherein:
group Ar represents a divalent group comprising at least one optionally substituted carbon-containing aromatic cycle;
group Q represents a single bond, $(CF_2)_n$ with $1 \leq n \leq 10$, or $C_2F_4OC_2F_4$;
and
group G represents a cation exchanging group,
or
e) esterifying the carboxylic acid function of said homopolymer obtained in step a) or said copolymer obtained in step b) using the aromatic monomer with an ionic function of formula (III'), and
f) optionally fluorinating the product of step d) or step e).

10. Method for synthesizing a fluoropolymer as claimed in claim 9, wherein the monomer of formula (I') is fluorinated acrylic or methacrylic acid.

11. Method for synthesizing a fluoropolymer as claimed in claim 9, wherein the monomer of formula (II') is vinylidene fluoride (VDF) and/or hexafluoropropene (HFP).

12. Method for synthesizing a fluoropolymer as claimed in claim 9, wherein step a) is carried out in the presence of a polymerisation initiator.

13. Method for synthesizing a fluoropolymer as claimed in claim 9, wherein said reducing of the carboxylic acid function into an alcohol function in step b) is carried out at 90° C., in the presence of a solvent composed of tetrahydrofuran and the $LiAlH_4$ catalyst.

14. Method for synthesizing a fluoropolymer as claimed in claim 9, wherein the aromatic monomer of formula (III') having an ionic function comprises para phenol sulphonic acid.

15. Method for synthesizing a fluoropolymer as claimed in claim 9, wherein said fluorinating in step d) is carried out in the presence of $SF_4$ or diluted HF.

16. Method for synthesizing a fluoropolymer as claimed in claim 9, wherein the cation exchanging group is selected among:

$SO_2R_1$, with $R_1$ representing OH, F or Cl; or $P(=O)(OR_2)_2$ with $R_2$ representing H or an optionally substituted alkyl group; or $CO_2H$.

17. Method for synthesizing a fluoropolymer as claimed in claim 10, wherein the monomer of formula (I') comprises trifluoromethylacrylic acid (TFMAA).

18. Method for synthesizing a fluoropolymer as claimed in claim 9, wherein the monomer of formula (II') comprises a perfluoroalkyl vinyl ether (PAVE), a perfluoroalkoxyalkyl vinyl ether (PAAVE), or combinations thereof.

19. Method for synthesizing a fluoropolymer as claimed in claim 9, wherein the group Q represents $C_2F_4OC_2F_4$.

20. Method for synthesizing a fluoropolymer as claimed in claim 9, wherein said fluoropolymer comprises at least 40 mole % to 60 mole % of monomer containing said ionic function.

* * * * *

UNITED STATES PATENT AND TRADEMARK OFFICE
CERTIFICATE OF CORRECTION

PATENT NO. : 7,615,600 B2  
APPLICATION NO. : 11/577011  
DATED : November 10, 2009  
INVENTOR(S) : Capron et al.

Page 1 of 1

It is certified that error appears in the above-identified patent and that said Letters Patent is hereby corrected as shown below:

Claim 9, at Column 8, Line 13: after "b) polymerizing at least one monomer of formula (I')" delete "or perfluorovinly ether:"

Claim 9, at Column 8, line 21: after "with at least one monomer of formula (II')" insert -- or perfluorovinly --

Signed and Sealed this

Sixteenth Day of February, 2010

David J. Kappos
*Director of the United States Patent and Trademark Office*